United States Patent

Rashid et al.

[11] Patent Number: 5,536,060
[45] Date of Patent: Jul. 16, 1996

[54] REINFORCED VEHICLE DOOR

[75] Inventors: Moinuddin S. Rashid, Bloomfield Hills; Chongmin Kim, Davisburg, both of Mich.

[73] Assignee: General Motors Corporation, Detroit, Mich.

[21] Appl. No.: 389,991

[22] Filed: Feb. 17, 1995

[51] Int. Cl.⁶ ........................................... B60J 5/04
[52] U.S. Cl. ..................... 296/146.6; 296/146.5; 49/502
[58] Field of Search ............................ 296/146.5, 146.6, 296/188, 189; 49/501, 502; 52/783.2, 783.19, 783.17, 784.12

[56] References Cited

U.S. PATENT DOCUMENTS

| | | | |
|---|---|---|---|
| 1,680,538 | 8/1928 | Gross | 52/783.12 |
| 3,964,208 | 6/1976 | Renner et al. | 49/502 |
| 4,306,381 | 12/1981 | Presto | 296/146.5 X |
| 4,786,100 | 11/1988 | Kleemann et al. | 296/146.6 |
| 5,056,264 | 10/1991 | Jewell, II et al. | 49/502 |
| 5,094,034 | 3/1992 | Freeman | 49/501 |
| 5,272,841 | 12/1993 | Freeman et al. | 49/502 |
| 5,277,470 | 1/1994 | Freeman et al. | 298/146.6 |
| 5,325,632 | 7/1994 | Djavairian et al. | 49/502 |

FOREIGN PATENT DOCUMENTS

| | | | |
|---|---|---|---|
| 57270 | 8/1982 | European Pat. Off. | 49/501 |
| 4116834 | 11/1992 | Germany | 296/146.5 |
| 2001626 | 1/1987 | Japan | 49/501 |
| 1189810 | 4/1970 | United Kingdom | 49/502 |
| 2152883 | 8/1985 | United Kingdom | 49/501 |

OTHER PUBLICATIONS

Murdock, Inc. Sales Brochure, undated.

*Primary Examiner*—Dennis H. Pedder
*Attorney, Agent, or Firm*—George A. Grove

[57] ABSTRACT

A vehicle door is reinforced by an integral reinforcement panel that is fixed to and reinforces side portions of an inner door panel. The reinforcement panel has an outer periphery adjacent and preferably abutting the outer door panel and includes stiffening flutes. Preferably, abutting portions of the outer panel and the stiffening panel are bonded together to form reinforcing box sections. Alternatively, a support panel may abut inner surfaces of the reinforcement panel and is preferably bonded to valley portions of the stiffening flutes to form the reinforcing box sections. The reinforcement panel may replace an anti-intrusion beam and other components of a conventional vehicle door.

18 Claims, 4 Drawing Sheets

REINFORCED VEHICLE DOOR

TECHNICAL FIELD

This invention relates to automotive vehicle doors reinforced with an anti-intrusion beam or panel.

BACKGROUND OF THE INVENTION

Current automotive-type vehicle doors generally comprise an assembly of parts including an inner panel, an outer panel, a door intrusion beam and an assortment of brackets and reinforcements which make up the structure of the door, window glass and associated lift mechanism, mountings and fasteners to facilitate manufacture and assembly, and mounting hinges, a latch, and a door handle for opening and closing the door. The intrusion beam may comprise a sub-assembly of a tube and/or one or more stamped steel components. However, a reinforcing panel supporting a lower portion of the outer panel has also been proposed.

SUMMARY OF THE INVENTION

The present invention provides an improved reinforced vehicle door assembly or structure. This structure includes a novel reinforcement panel which supports a major portion of the outer panel surface below the window sill, providing intrusion protection over this lower panel area. The reinforcement panel includes front and rear sidewalls overlapping and assembled with front and rear edge portions of the inner panel to provide stiffening of these hinge mounting and latch containing side portions.

Preferably, the reinforcement panel includes a number of longitudinal flutes with intermediate peripheral surfaces that are bonded to the outer panel and/or to an optional support panel to form hollow load-bearing sections. For light weight, the door panels are preferably made of alloys of aluminum although alloys of other materials, such as steel and magnesium, and metal matrix composites and various polymer materials, including reinforced polymer composites, may be used if desired. In a preferred embodiment, the reinforcement panel is made by superplastic forming from a suitable aluminum alloy or other superplastically formable material capable of providing the complex shapes required for the selected panel configuration. Other suitable means of forming the reinforcement panel may be used if desired.

In general, the present invention can consolidate the functions of many of the pieces that make up a conventional intrusion beam sub-assembly plus that of other associated parts and replace them with a single reinforcement panel. The panel preferably has a large longitudinally-extending peripheral surface with several flutes extending the entire length or a pan of the length. Preferably, at least portions of the peripheral surface conform to contiguous portions of the contour of the door outer panel. Reinforcement panel thickness, material strength and cross-section of the flutes can be tailored to match the impact energy that must be absorbed in a lateral impact to the vehicle. Optionally, vertical or other flute arrangements or other patterns may be provided if desired.

In addition, this one-piece panel will include, if desired, laterally extending vertical side walls which can also be designed with flutes, if necessary, to impart section stiffness and/or strength to the reinforcement panel. The panel can also be designed to include laterally extending horizontal walls at the top and/or bottom, each with or without flutes. Thus, the reinforcement panel can be made in the shape of a one-piece tray with flutes of the desired shape, size and pattern or layout on the large peripheral portion of the tray as well as along its walls, if preferred.

The reinforcement panel can be placed and fastened inside a door inner panel of conventional or other design, as is the intrusion beam assembly in a current door. This can be done in such a manner that the longitudinal flutes in the reinforcement panel are essentially parallel to the large flat section of the inner panel and the lateral vertical walls in the reinforcement panel mate very closely with the laterally extending vertical side portions of the door inner panel. If the reinforcement panel has upper and/or lower walls, then these are preferably designed to mate with and be joined to their counterparts on the inner panel. Thus, the two panels will form a very effective closed box-section structure of required strength and stiffness.

This new two-piece sub-assembly is then joined with the door outer panel such that the peripheral surface(s) of the reinforcement panel abuts contiguous portions of the outer panel. Preferably, the peaks on the flutes which abut the outer panel are bonded adhesively or in some other suitable way to the inside surface of the outer panel. Thus, the outer panel forms with the reinforcement panel a series of closed-section beams to increase the strength and stiffness of the door assembly as well as serve to stabilize the reinforcement panel. Alternatively (or in addition), rather than bond to the outer panel, a similar series of closed-section strengthening and stiffening beams can be formed by bonding adhesively or otherwise the inwardly protruding portions or valleys of the flutes on the reinforcement panel to an optional support panel which may be made to conform to the inside shape of the reinforcement panel.

The reinforcement panel of this invention may be too complex to be made in one piece by conventional stamping, roll-forming or extrusion processes with either steel or aluminum. In such cases, a different process is suggested for fabricating the reinforcement panel. This is the known process of superplastic forming.

When certain alloy compositions of steel or aluminum are suitably processed (such as with a very fine grain microstructure), they exhibit superplastic behavior at certain elevated temperatures. When deformed at these temperatures, the ductility (or elongation before yield or failure) of these materials exceeds several hundred percent. Such high levels of ductility can enable fabrication of very complex structures in a single sheet of material. A reinforcement panel of the design discussed above can be fabricated in one piece using such techniques. Such panel then can cooperate structurally with an adjacent conforming panel to form a strong but light weight door.

In addition to various steels and aluminum alloys, other structural materials such as zinc, brass, magnesium, titanium and their alloys have also been reported to exhibit superplastic behavior. Furthermore, certain polymers and reinforced polymer composites have the required ductility to make this panel. These materials and other metal matrix composites could also be used to make the reinforcement panel of this invention, if desired.

In a test of this invention, a steel tool was built having an internal die cavity shaped to the desired contour of the reinforcement panel. Aluminum alloy 5083, which exhibits superplastic behavior at around 510° C., was selected for making the panel. The tool was heated and maintained at the desired temperature. A sheet of 5083 aluminum of the proper size was placed in the tool, and air or nitrogen gas at a maximum pressure of 300 psi was applied to deform the sheet into the female cavity. After about 30 minutes, the flat sheet of aluminum was found to have stretched fully into the tool cavity, accurately replicating the contours of the die surface and thus producing the reinforcement panel of the desired shape.

This one-piece reinforcement panel was used instead of the ten pieces it replaced to build a door according to the invention. All other pieces used to build this door were of existing conventional design. The door was subjected to standard door tests, which it successfully passed. In addition, the reinforcement panel provided effective intrusion protection over the entire lower surface of the door.

These and other features and advantages of the invention will be more fully understood from the following description of a specific embodiment of the invention taken together with the accompanying drawings.

DETAILED DESCRIPTION OF THE PREFERRED EMBODIMENT

Figure 1:
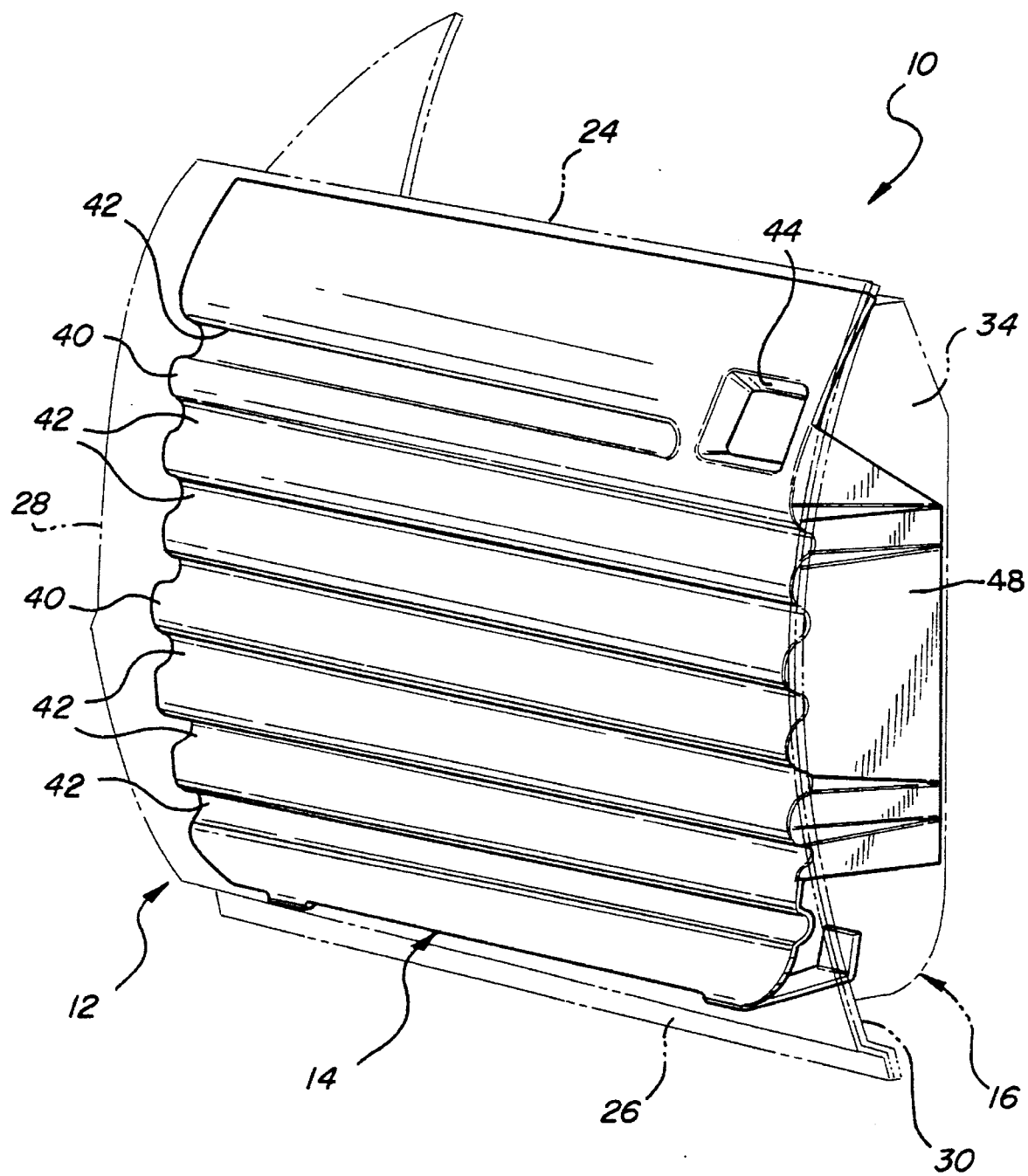
FIG. 1 it a pictorial view, partially in phantom, illustrating the assembly of a reinforced vehicle door according to the invention.
Figure 2:
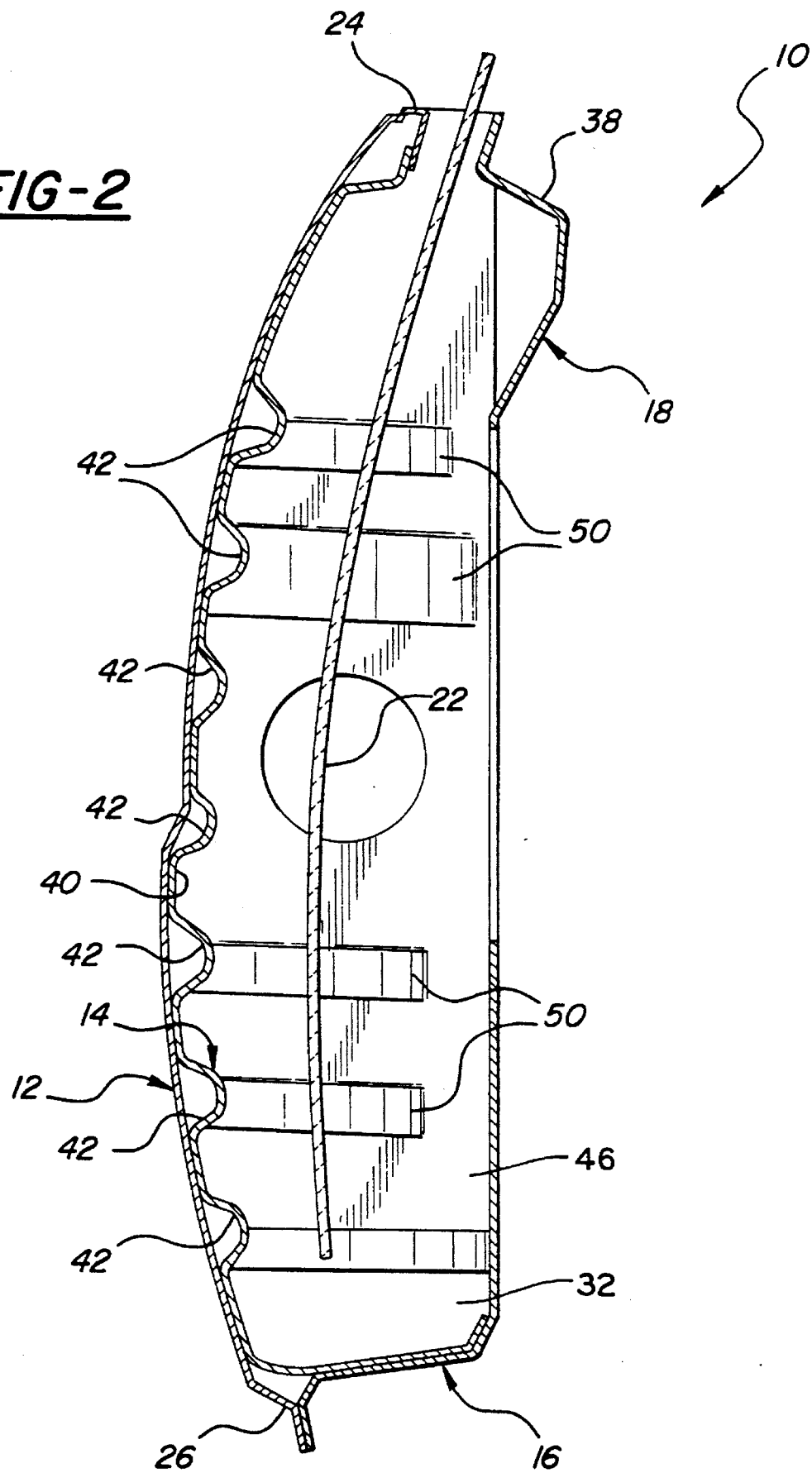
FIG. 2 is a vertical cross-sectional view through the door assembly of FIG. 1.
Figure 3:
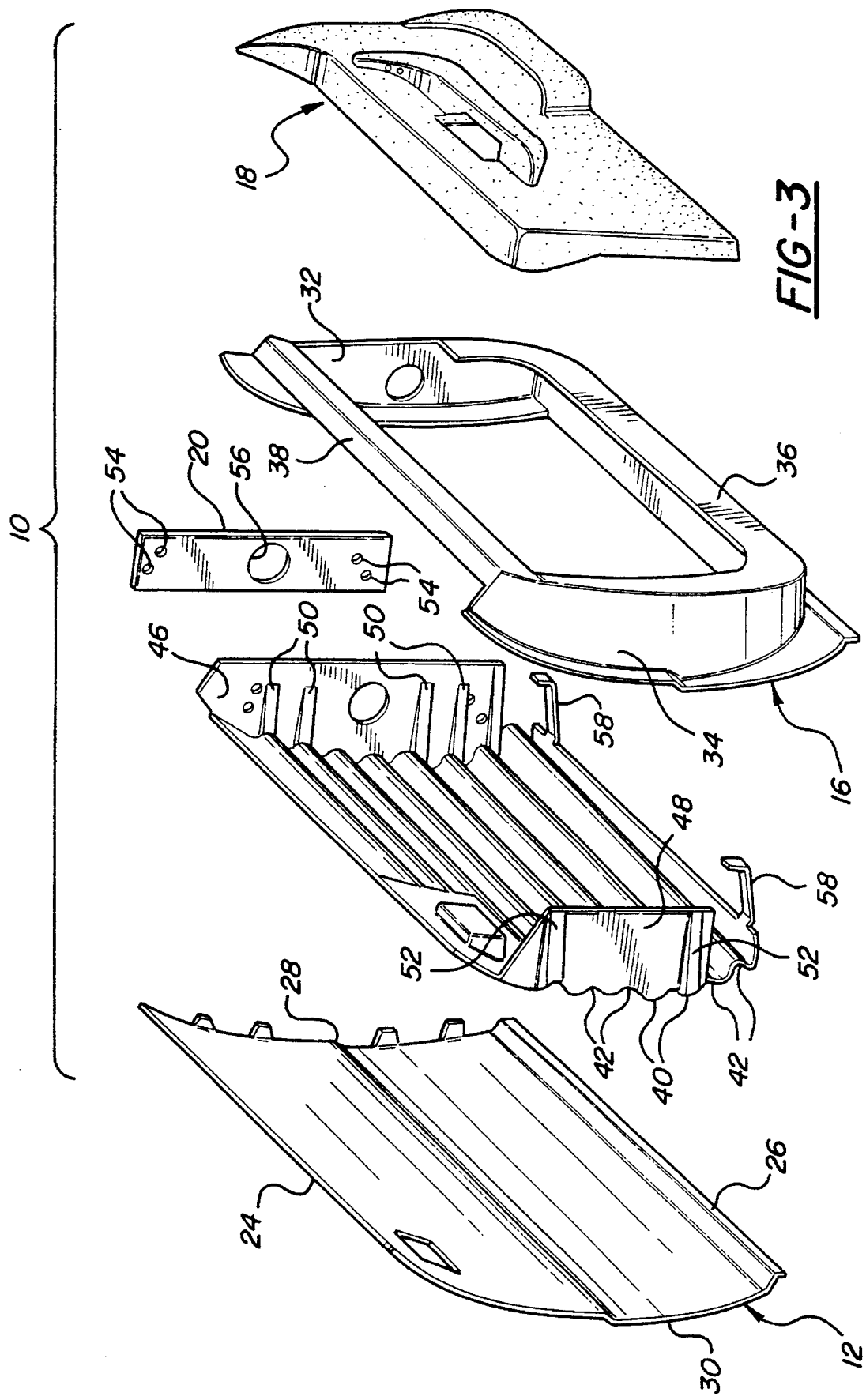
FIG. 3 is an exploded pictorial view illustrating the major components of the door assembly of FIGS. 1 and 2.

Referring now to the drawings in detail, numeral 10 generally indicates a vehicle door formed according to the invention to be stiffened or reinforced against impact on its outer surface while requiring fewer parts and less complicated assembly. Door 10 includes an outer panel 12, a reinforcement panel 14, an inner panel 16 and an inner cover 18 as well as a hinge plate 20 joined together into an assembly. In the cross-sectional view of FIG. 2, the window glass 22 is also shown. Not shown in the drawings are the hinges, door latch, door handle and window lift mechanism which would need to be added to provide an operational door. However, these non-illustrated elements do not form part of the present invention and are omitted for clarity.

The outer panel 12, formed of a single sheet of material, has a generally smooth exterior, slightly contoured in accordance with the exterior styling of the associated vehicle. It includes an upper edge 24 forming in part an outer window sill, a bottom edge 26, and front and rear edges 28, 30, each including material for assembly with the inner panel.

The inner panel 16 includes vertically and laterally extending front and rear side portions 32, 34, respectively, longitudinally connected by a bottom portion 36. A window sill support member 38 interconnects the upper ends of the front and rear side portions. Outer edges of the front and rear side portions and the bottom portion are adapted for connection with the corresponding parts of the outer panel 12. In addition, the bottom portion includes structural support members for the window lift mechanism, not shown. Panel 16 is suitably stamped and trimmed from a single sheet of material.

The inner cover 18 is adapted to attach to the inner panel to cover the open center where the window lift mechanism and door latch mechanisms are located. Cover 18 is removable in order to allow access to these mechanisms for service.

The reinforcement panel 14, like the outer panel, is formed from a single sheet. However, its configuration in the illustrated embodiment is considerably more complex such that it is preferably manufactured by a known, but relatively new, method called superplastic sheet forming. This method requires the use of materials which have superplastic forming qualities including very high ductility at forming temperature which may be around 500° C. for aluminum and 100020 C. for stainless steel. Such superplastically formable alloys usually have to be processed to have very fine grained metallurgical microstructures which provide such increased ductility. Thus, a sheet of such material can be formed into a complex shape without tearing or other failure.

The reinforcement panel 14 is configured with an outer periphery 40 that as shown comprises a plurality of longitudinal surfaces (all 40) which approximate or conform to the shape of the inner side of the outer panel 12. This outer periphery 40 (with its plurality of surfaces) extends from near the bottom edge 26 of the outer panel to adjacent to the upper window sill edge 24 and longitudinally along the length of the outer panel over the distance between the front and rear side portions 32, 34 of the inner panel. The outer periphery of the reinforcement panel is provided with (or interrupted with) a plurality of, in this case seven, longitudinally extending flutes 42. These are, optionally, each about three centimeters wide, have a bell-shaped cross section and extend the full length of the reinforcement panel, except for one which stops short of an opening 44 for the door handle.

At the front and rear edges of the reinforcement panel are vertical inwardly extending front and rear side walls 46, 48, respectively. These side walls extend within and are fixed such as by welding to the corresponding front and rear side portions 32, 34, respectively, of the inner panel. Four laterally extending flutes 50 are provided in the front side wall for stiffening its structure, and two laterally extending flutes 52 are provided in the rear side wall for the same purpose.

The hinge plate 20 is fixed to the inner side of the front side wall 46 and contains openings 54 for receiving hinge connection fasteners as well as a central opening 56 aligned with corresponding openings in the front side wall 46 and front edge 28 of the reinforcement panel and inner panel, respectively, for the passage of necessary wiring. The front and rear side walls 46, 48 of the reinforcement panel add to the structural stiffness of the front and rear door outer panel side portions 32, 34 and provide a stiff box-like support for the reinforcement panel outer portion. If, as shown, the reinforcement panel is not provided with an optional lower wall, lateral strips 58 may be added for assisting in assembly of the panel to the bottom portion of the inner panel.

Preferably, in assembly, portions of the outer periphery 40 of the reinforcement panel between the flutes 42 are positioned in abutting relation to contiguous portions of the outer panel and are preferably fixed thereto, such as by bonding. In similar manner, the peripheral edges of the outer panel may also be bonded to the reinforcement panel. The bonded portions of the outer panel and reinforcement panel join with the flutes to form load-bearing box sections, i.e., or hollow load-bearing sections, which add to the stiffness of the outer panel-reinforcement panel assembly and improve the strength of the door assembly against intrusion.

Figure 4:
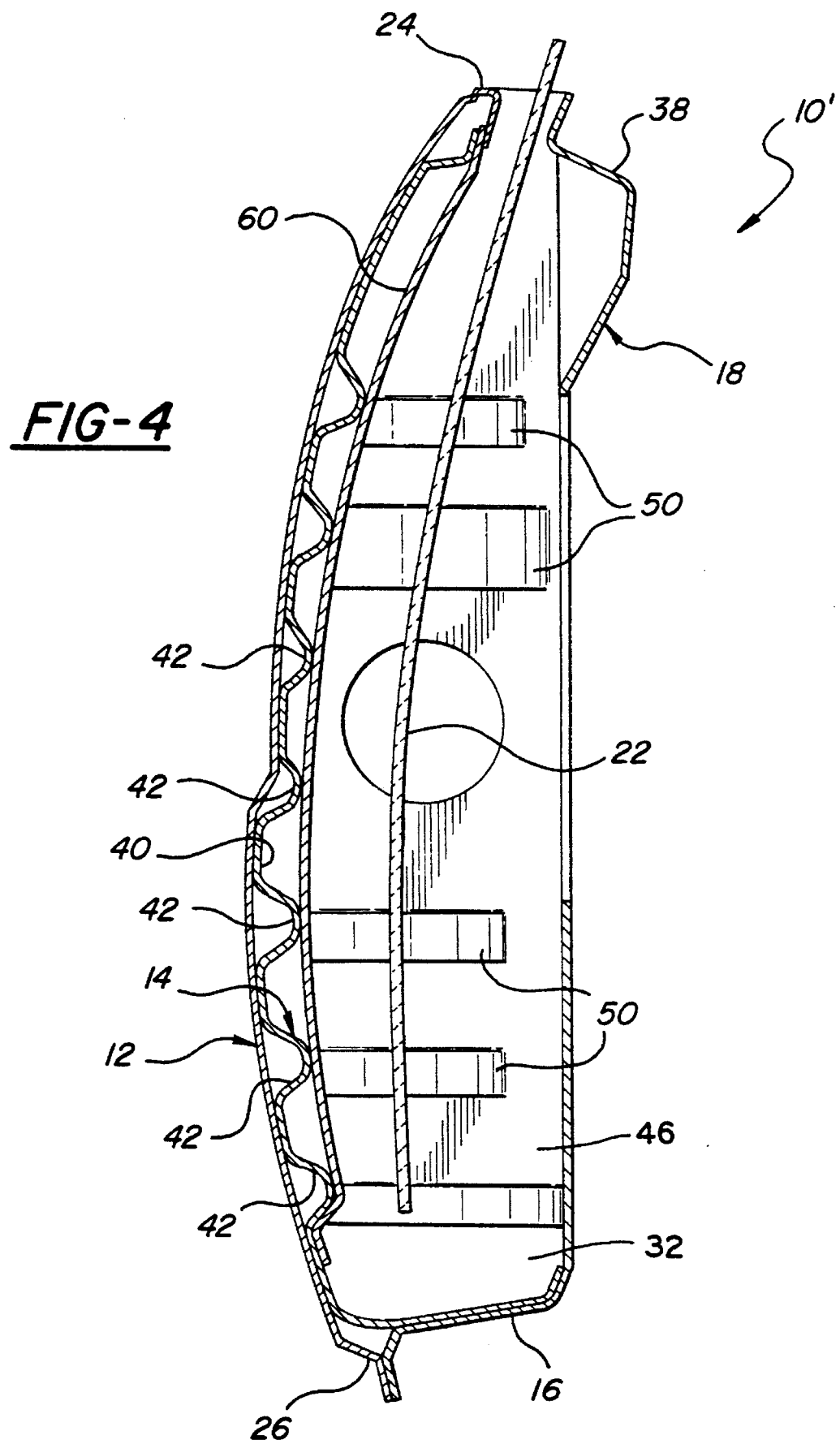
FIG. 4 is a view similar to FIG. 2 showing an alternative embodiment of reinforced door according to the invention.

FIG. 4 shows an alternative embodiment of door 10' containing a separate support panel 60. Panel 60 conforms to the inside of the reinforcement panel 14 and is preferably bonded to the adjacent surfaces of the valleys (or inner portions) of the flutes 42 to form stiffness- and strength-enhancing closed box sections. The arrangement is particularly desirable where bonding between the outer panel and the reinforcement panel is not desired as the box section structure is provided by assembly of the support and reinforcement panels.

For weight reduction, it is presently preferred that the reinforcement panel, as well as the inner and outer panels, be made from a suitable aluminum alloy material. However, other materials may also be used within the scope of the present invention. For example, polymer materials, fiber-polymer composites, and metals such as steel may be utilized in any of the panels if desired. The inner cover is sometimes formed from a plastic or plastic/fiber composite material suitable for vehicle interior use.

Thus, the subject invention provides a tough, durable, impact-resistant vehicle door structure from a minimal number of structurally cooperating formed sheet members. Furthermore, because of the reduced number of pieces, the weight of the door can be reduced and manufacture and assembly of the door is enhanced.

While the invention has been described by reference to certain embodiments, numerous other changes could be made within the spirit and scope of the inventive concepts described. Thus, the invention should not be limited to the disclosed embodiments but should have the full scope permitted by the language of the following claims.

What is claimed is:

1. A door for vehicles comprising outer panel means and inner panel means connected to form an assembled door defining a central space between the panel means for receiving a window glass, said outer panel means including an outer panel and a reinforcement panel and the inner panel means including an inner panel with generally upright and laterally outwardly extending front and rear side portions longitudinally connected by a bottom portion, said outer panel extending from adjacent said bottom portion up to at least a window sill area and being formed of a single sheet configured to present a desired external appearance, characterized in that:

said reinforcement panel includes a single sheet having an outer periphery lying adjacent said outer panel at said window sill area and near said bottom portion and conforming in shape to the adjacent inner surface of said outer panel at intermediate locations, said reinforcing panel extending longitudinally to spaced generally upright and inwardly extending front and rear side walls opposedly overlapping and secured in assembly with said outwardly extending front and rear side portions of the inner panel means.

2. A door as in claim 1 characterized in that said reinforcement panel abuts said outer panel adjacent said window sill area and near said bottom portion and at said intermediate locations.

3. A door as in claim 2 characterized in that abutting surfaces of the reinforcement panel are connected to the outer panel by bonding.

4. A door as in claim 3 characterized in that the reinforcement panel is configured to form with the outer panel a plurality of hollow load bearing sections.

5. A door as in claim 4 characterized in that the reinforcement panel includes flutes forming with the/outer panel said load bearing sections.

6. A door as in claim 5 characterized in that the reinforcement panel includes outer portions intermediate said flutes abutting and bonded to said outer panel.

7. A door as in claim 5 characterized in that said flutes extend longitudinally.

8. A door as in claim 5 characterized in that at least one of said side walls of the reinforcement panel also includes flutes.

9. A door as in claim 8 characterized in that the flutes in said at least one side wall extend laterally.

10. A door as in claim 1 characterized by a support panel fixed with respect to said reinforcement panel and abutting inner portions of said reinforcement panel.

11. A door as in claim 10 characterized in that said support panel is bonded to adjacent inner surfaces of said reinforcement panel.

12. A door as in claim 11 characterized in that said adjacent inner surfaces of the reinforcement panel comprise inner valley surfaces of flutes formed in said reinforcement panel.

13. A door as in claim 1 characterized in that said reinforcement panel is made of aluminum alloy.

14. A door as in claim 1 characterized in that said reinforcement panel is formed by superplastic forming.

15. A door as in claim 1 characterized in that said inner panel means also includes an inner cover mountable on said inner panel to close an open center thereof.

16. A door as in claim 15 characterized in that the inner panel and the reinforcement panel are both made of aluminum alloy.

17. A door as in claim 16 characterized in that said outer panel is also made of aluminum alloy.

18. A door as in claim 5 characterized in that there are at least four of said flutes.

\* \* \* \* \*